United States Patent
Lee et al.

(10) Patent No.: US 7,801,636 B2
(45) Date of Patent: Sep. 21, 2010

(54) METHOD AND SYSTEM FOR MANAGING WAFER PROCESSING

(75) Inventors: Nam-young Lee, Yongin-si (KR); Pil-woong Bang, Seoul (KR); Yeong-lyeol Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 171 days.

(21) Appl. No.: 11/851,008

(22) Filed: Sep. 6, 2007

(65) Prior Publication Data

US 2008/0077269 A1      Mar. 27, 2008

(30) Foreign Application Priority Data

Sep. 22, 2006    (KR) ...................... 10-2006-0092399

(51) Int. Cl.
    *G06F 19/00*    (2006.01)
(52) U.S. Cl. ..................... 700/121; 700/110; 716/4; 716/21
(58) Field of Classification Search ......... 700/108–110, 700/121; 716/4, 19, 21
    See application file for complete search history.

(56) References Cited

U.S. PATENT DOCUMENTS 6,477,685 B1 * 11/2002 Lovelace ..................... 716/4
6,862,495 B2    3/2005 Kahn et al.
6,947,804 B1    9/2005 Pak et al.
2005/0097481 A1   5/2005 Mitsutake et al.

FOREIGN PATENT DOCUMENTS

| JP | 11-344799 | 12/1999 |
|---|---|---|
| JP | 2002-124445 | 4/2002 |
| KR | 2002-0015288 | 2/2002 |
| KR | 1020030008997 | 1/2003 |
| KR | 1020040076568 | 9/2004 |
| KR | 10-0583531 | 5/2006 |

OTHER PUBLICATIONS

Notice of Allowance dated Mar. 26, 2008 issued in corresponding Korean patent appln. No. 10-2006-0092399.

* cited by examiner

*Primary Examiner*—Charles R Kasenge
(74) *Attorney, Agent, or Firm*—F. Chau & Associates, LLC

(57) ABSTRACT

Disclosed are a method of managing a process and a process managing system in which a failure-generating process step can be quickly detected. The method of managing a process includes sequentially performing first to n-th (n is a natural number) process steps with respect to a plurality of wafers, the order that the plurality of wafers are processed in each of the n process steps are different from one another. Calculating characteristic parameter values for the plurality of wafers, calculating first to n-th relations that indicate relationships between the first to n-th process orders and the characteristic parameter values, performing a Fourier transform on the first to n-th relations so as to calculate first to n-th conversion relations, and determining the existence of patterns among the first to n-th relations using the first to n-th conversion relations.

26 Claims, 9 Drawing Sheets

METHOD AND SYSTEM FOR MANAGING WAFER PROCESSING

CROSS REFERENCE TO RELATED APPLICATION

This application claims priority under 35 USC 119 from Korean Patent Application No. 10-2006-0092399 filed on Sep. 22, 2006, in the Korean intellectual Property Office, which is incorporated by reference herein in its entirety.

BACKGROUND OF THE INVENTION

1. Field of the Invention

The present invention relates to a method of managing semiconductor wafer processing and a process managing system.

2. Description of the Related Art

Semiconductor wafer processing comprises a complex series of typically sequential steps through a number of semiconductor processing tools adapted to perform various processes. Such processes include, but are by no means limited to, photoresist deposition, exposure, and development; etching; deposition of conductive and dielectric layers; and planarization. Often, a single wafer may undergo the same operations multiple times as each layer of circuit design is created. Frequently, it is desirable to clean the wafer before certain process steps.

In semiconductor fabricating processes, when one product is manufactured through a plurality of process steps (for example, about a hundred process steps), if a defect occurs in the product it is difficult to figure out which process step caused the failure. Moreover, the financial competitiveness in a manufacturing process depends upon how quickly and accurately the failure can be detected and the cause of the occurrence of the failure can be corrected.

The conventional methods of detecting a process step where a failure has occurred, (i.e., fault correlation) are the commonality analysis method and the physical failure analysis method.

According to the commonality analysis method, the process equipment that performs a process in common to a plurality of failure lots is identified, and thus it is determined that the identified process equipment has caused the failures. However, in order to obtain a statistically significant data set in the conventional commonality analysis method, at least three failure lots need to be generated, and a plurality of failure lots are generally common to not only a failure process step but also a plurality of other process steps. Accordingly, the number of process steps need to be inspected, which increases time and cost.

In the physical failure analysis method, a failure (fault) point of a failure chip is searched, and the failure is directly searched by delayering to the failure point of the failing (faulty) chip. However, in the physical failure analysis method, it is difficult to accurately find out the failure point of the faulty chip, and much time and high cost are required.

SUMMARY OF THE INVENTION

According to a first aspect of the invention, there is provided a method of managing a process, the method including sequentially performing first to n-th (n is a natural number) process steps with respect to a plurality P of wafers, wafer orders (process orders of the plurality of wafers) in the first to n-th process steps are different from one another, calculating characteristic parameter values for the plurality of respective wafers, calculating first to n-th relations that indicate relationships between the first to n-th process orders and the characteristic parameter values, performing a Fourier transform on the first to n-th relations so as to calculate first to n-th conversion relations, and determining any patterns among the first to n-th relations using the first to n-th conversion relations.

According to a second aspect of the invention, there is provided a method of managing a process, the method including calculating characteristic parameter values for a plurality P of wafers on which processes are performed in specific process orders, calculating relations that indicate relationships between the specific process orders and the characteristic parameter values, performing a Fourier transform on the relations so as to calculate conversion relations, and determining any patterns among the relations using the conversion relations.

According to a third aspect of the invention, there is provided a process managing system, the process managing system including a plurality of process equipment sequentially performing first to n-th (n is a natural number) process steps with respect to a plurality P of wafers, process orders of the plurality of wafers in the first to n-th process steps being different from one another, an analyzer calculating first to n-th relations that indicate relationships between the first to n-th process orders and characteristic parameter values calculated from the plurality of wafers, respectively, performing a Fourier transform on the first to n-th relations so as to calculate first to n-th conversion relations, and determining any patterns among the first to n-th relations using the first to n-th conversion relations, and a controller controlling the plurality of process equipment and the analyzer.

BRIEF DESCRIPTION OF THE DRAWINGS

Hereinafter, the invention will be described more fully with reference to the accompanying drawings, in which preferred embodiments of the invention are shown. The above and other features of the invention will become more apparent to persons skilled in the art by describing in detail preferred embodiments thereof with reference to the attached drawings in which like reference numerals refer to like elements, and.

DETAILED DESCRIPTION OF PREFERRED EMBODIMENTS OF THE INVENTION

Figure 1:
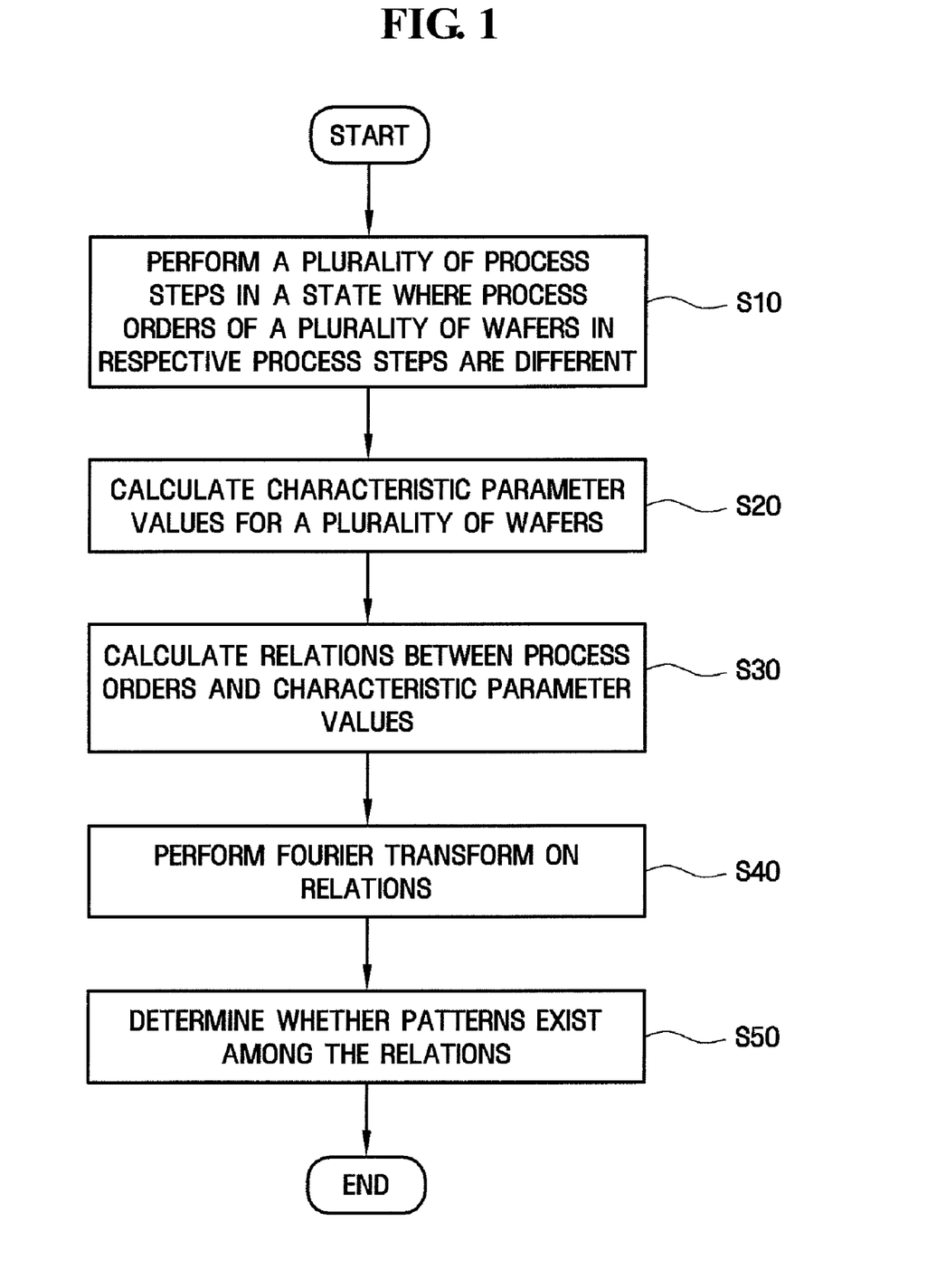
FIG. 1 is a flowchart illustrating a method of managing a process according to an embodiment of the invention.
Figure 2:
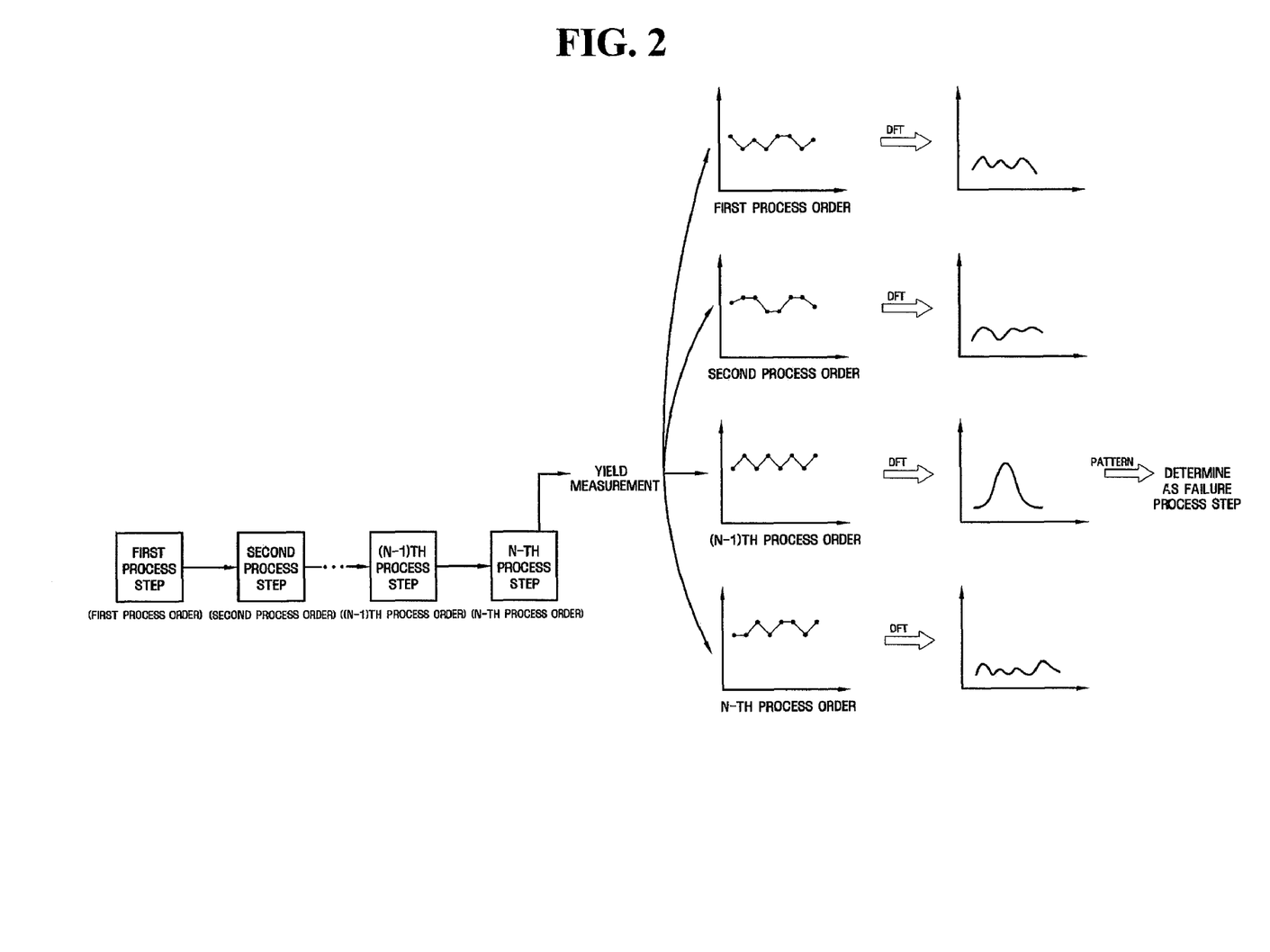
FIG. 2 is a conceptual diagram illustrating the method of FIG. 1.

FIGS. 1 and 2 are a flowchart and a conceptual diagram, respectively, illustrating a method of managing a process according to embodiments of the invention. FIGS. 3 to 7 are diagrams specifically illustrating respective steps of the method of FIG. 1.

Referring to FIGS. 1 and 2, a plurality, first to n-th (n is a natural number) of process steps are sequentially performed on a plurality W (W is a natural number) of wafers (STEP S10). The process orders (order of processing the plurality W of wafers) in the first to n-th process steps are different from one another.

Typically, a plurality W of wafers are stored in a wafer transfer container, for example. FOUP (front opening unified pod) to be moved in a lot unit (for example, containing 25 wafers, i.e., W=25)). Further, among process equipment that perform processing steps, there are batch equipment that performs processes in at least one entire lot unit (typically, one to four lot units), and single equipment that takes out each of the wafers sequentially from the wafer transfer container (cassette) and performs the processes on each wafer. In the preferred embodiments of the invention, process orders of wafers being different in the respective process steps means that in the case of using the batch equipment, the arrangement orders of a plurality W of wafers in the batch equipment are different from one another, and in the case of using the single equipment, the process orders of the plurality W of wafers that are taken out from the wafer transfer container and are subjected to processes are different from one another.

Figure 3:
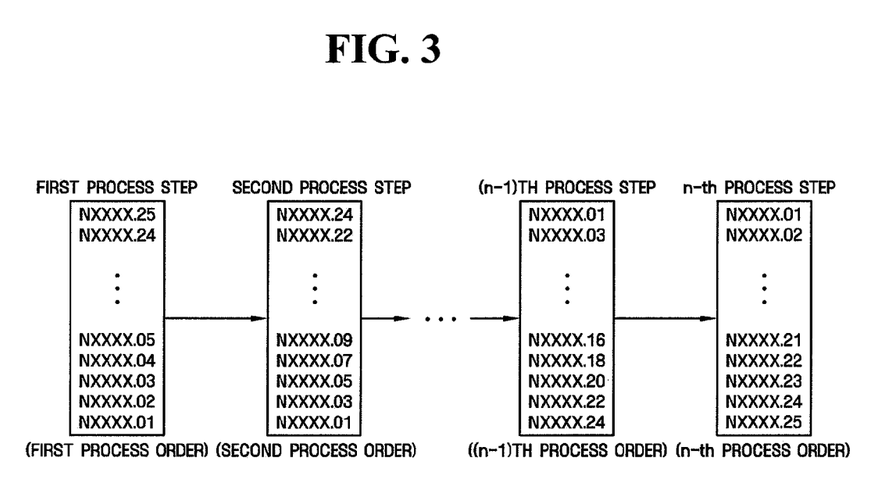
FIG. 3 is a conceptual diagram illustrating a step S10 of the method of FIG. 1.

The order of performance of the first to n-th processes are determined, as shown in FIG. 3. The first order of performance in the first process step may be based on the (original) order of the wafers, e.g., as indicated by the wafer IDs (identification, wafer numbers) NXXXX.01→NXXXX.02→NXXXX.03→NXXXX.04→NXXXX.05→ . . . →NXXXX.24→NXXXX.25, The second process order in the second process step may be based on the order of a wafer ID (identification) NXXXX.01→NXXXX.03→NXXXX.05→NXXXX.07→NXXXX.09→ . . . →NXXXX.22→NXXXX.24. Further, the (n−1)th process order in the (n−1)th process step may be based on the order of a wafer ID (identification) NXXXX.24→NXXXX.22→NXXXX.20→NXXXX.18→NXXXX.16→ . . . →NXXXX.03→NXXXX.01. Finally, the n-th process order in the n-th process step may be based on the reverse order of a wafer ID (identification) NXXXX.25→NXXXX.24→NXXXX.23→NXXXX.22→NXXXX.21→ . . . →NXXXX.02→NXXXX.01.

Figure 4A:
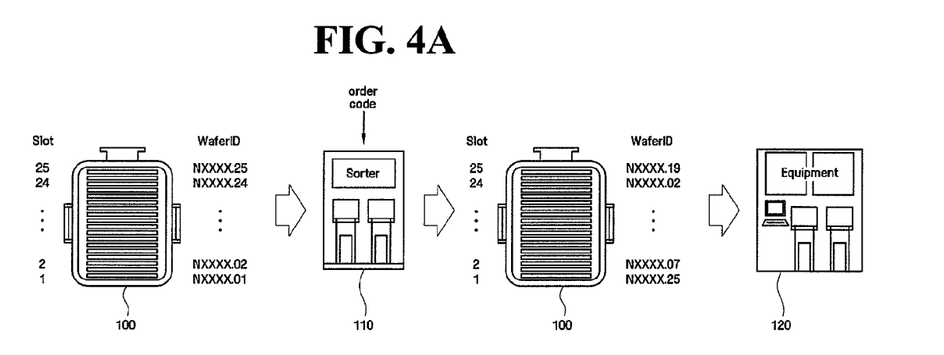
FIGS. 4A and 4B are conceptual diagrams illustrating a specific method that performs step S10 of the method of FIG. 1.

As shown in FIG. 4A, when the process equipment used in the process step is batch equipment 120, process orders of wafers in the process steps may be determined by using a sorter 110. For example, in a situation where a plurality W of wafers are aligned in slots of a wafer transfer container (cassette) 100, the sorter 110 receives an order code, and shuffles the plurality of wafers in the slots of the wafer transfer container 100 according to the order code and inserts the plurality of wafers again into the slots of the wafer transfer container 100. The wafer transfer container 100 is transmitted to the batch equipment 120 and various processes are performed. In the case of the batch equipment 120, since a function for changing process orders of wafers in the process equipment does not exist in general, a separate sorter 110 is used in changing the process orders.

Figure 4B:
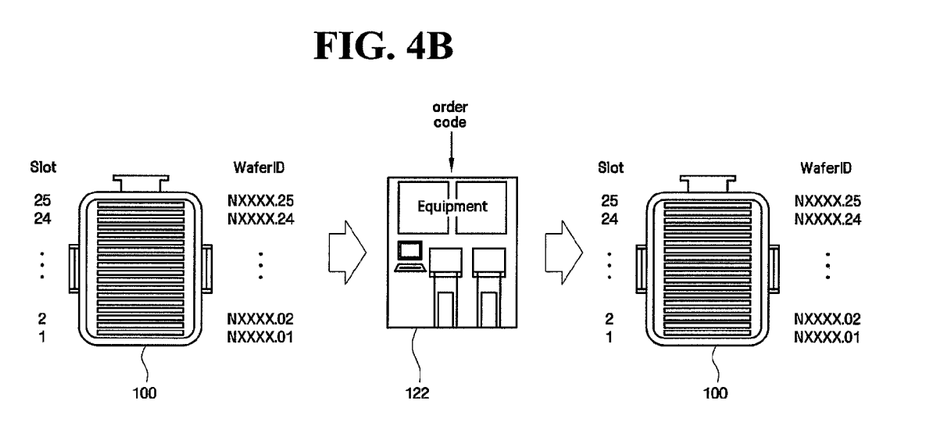

As shown in FIG. 4B, when the process equipment used in the process steps is single equipment 122, process orders in the process steps may be determined by using a wafer-handling function of the single equipment 122 itself instead of using the sorter 110. The single equipment 122 preferably has a wafer-loading function performed by tools having pick and place capability (i.e., random access to any water in the cassette at any time, rather than accessing the wafers sequentially only). For example, in a situation where a plurality W of wafers are aligned in W slots of the wafer transfer container 100, the single equipment 122 receives an order code, selects and takes out one of the plurality of wafers (e.g., one by one) from the slots of the wafer transfer container 100 according to the order code so as to perform processes, and re-inserts each of the plurality of wafers again into the original slots of the wafer transfer container 100.

In FIGS. 4A and 4B, the batch equipment 120 uses the sorter 110, and the single equipment 122 uses the pick and place capability selection function thereof. However, the invention is not limited thereto. For example, the single equipment 122 may use the sorter 110.

Further, according to a preferred embodiment of the invention, the first to n-th process orders of the first to n-th process steps are different from one another, but the invention is not limited thereto. Thus, the process orders of a portion of the process steps may be the same. For example, the process order of the first process step may be the same as the process order of the second process step, and the process order of the (n−1)th process step may be the same as the process order of the n-th process step.

Referring to FIGS. 1 and 2 again, characteristic parameter values for the plurality of respective wafers are calculated (STEP S20).

Specifically, examples of the characteristic parameter values may include, for example, DC parameters, such as a yield, a current value, and a voltage value, an interval between two lines, a minimum enclosure of a line or a via, a thickness of a gate oxide layer, the number of defects, and the like. Further, the characteristic parameter values may be measured after all of the process steps are completed, or may be measured in a situation where the process steps are pending. FIG. 2 shows an example of measuring a yield after the first to n-th process steps are completed. However, the invention is not limited thereto.

Then, the first to n-th relations that indicate relationships between the first to n-th process orders and the characteristic parameter values are calculated (STEP S30).

Thus, the first relation between the first process order and the characteristic parameter value, the second relation between the second process order and the characteristic parameter value, the (n−1)th relation between the (n−1)th process order and the characteristic parameter value, and the n-th relation between the n-th process order and the characteristic parameter value are calculated. The first to n-th relations are shown by graphs of FIG. 2.

Then, the Fourier transform is performed on the first to n-th relations so as to calculate the first to n-th conversion relations (STEP S40).

Specifically, the Fourier transform is a method that converts a signal, (sine waves, e.g., sound wave or electric wave) from the time domain to the frequency domain. Thus, the signal can be represented by a sum of sine waves having specific frequencies by the Fourier transform. Therefore, if the Fourier transform is used, the specific frequency components of the signal can be calculated.

The Fourier transform (in particular, DFT (Discrete Fourier Transform)) can be represented by the following Equation 1. In Equation 1, $\omega_p$ indicates the frequency, and $t_k$ indicates a wafer ID. $F(\omega_p)$ indicates a Fourier-transformed function (conversion relation), and $f(t_k)$ indicates a function (relation) before being subjected to the Fourier transform.

$$F(\omega_p) = \sum_{t_k} f(t_k) \exp(i w_p t_k) \qquad \text{[Equation 1]}$$

Patterns of the first to n-th relations are determined by using the first to n-th conversion relations (STEP S50).

Thus, it is determined whether first to n-th conversion relations have specific patterns, for example, having specific periods, or whether the values of the first to n-th conversion relations are continuously increased or continuously decreased.

When the conversion relations are calculated through the Fourier transform, for example, the meaning of the frequency $\omega_p$ is as follows.

Figure 5A:
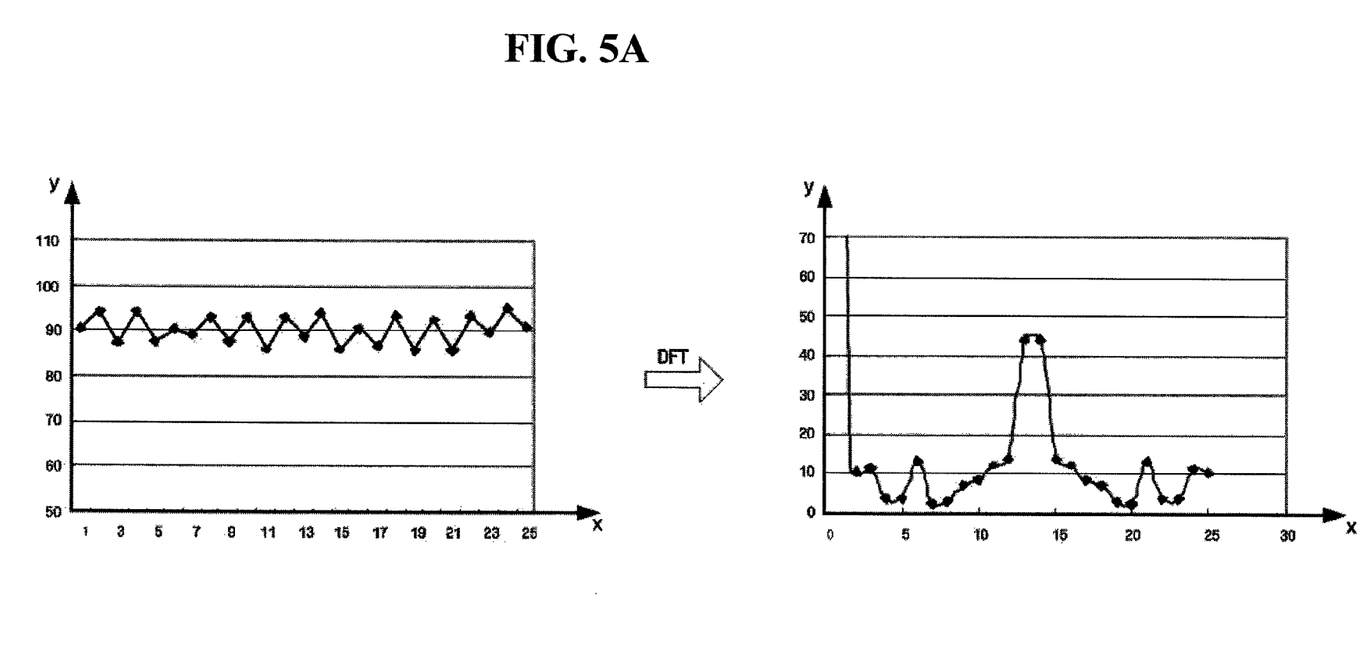
FIGS. 5A to 5C are graphs each illustrating a examples of the relation in step S30 of FIG. 1 and the conversion relation in step S40.
Figure 5B:
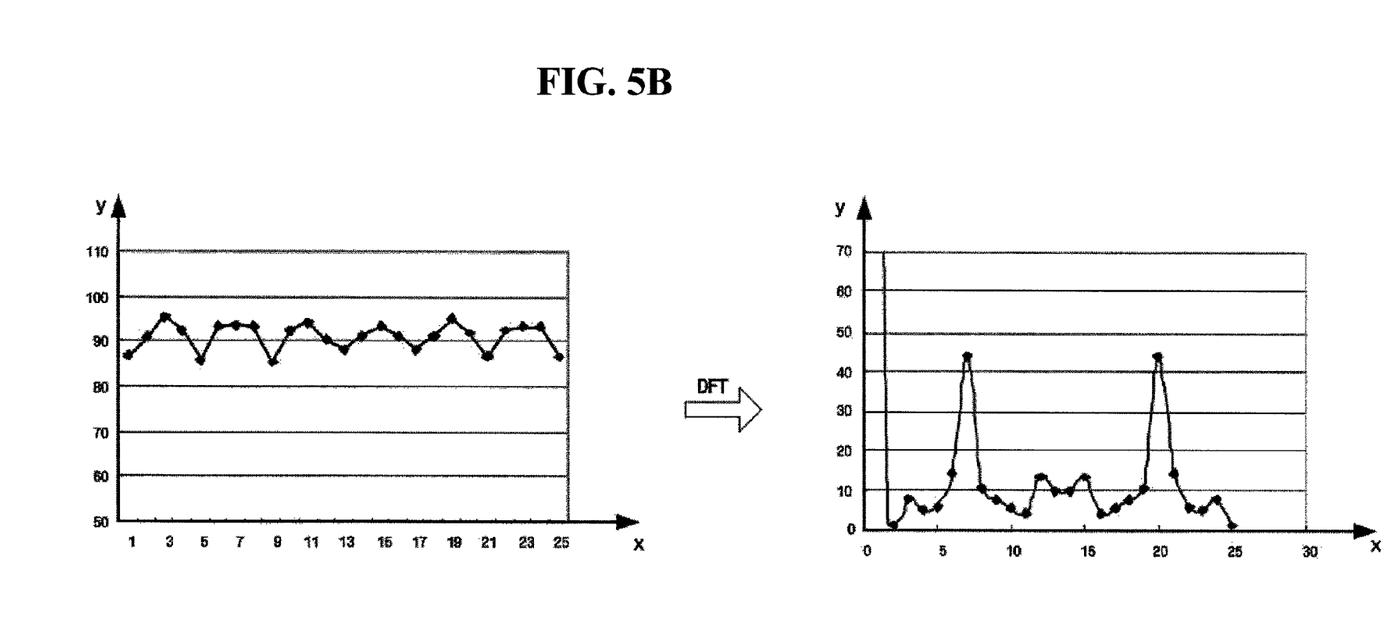
Figure 5C:
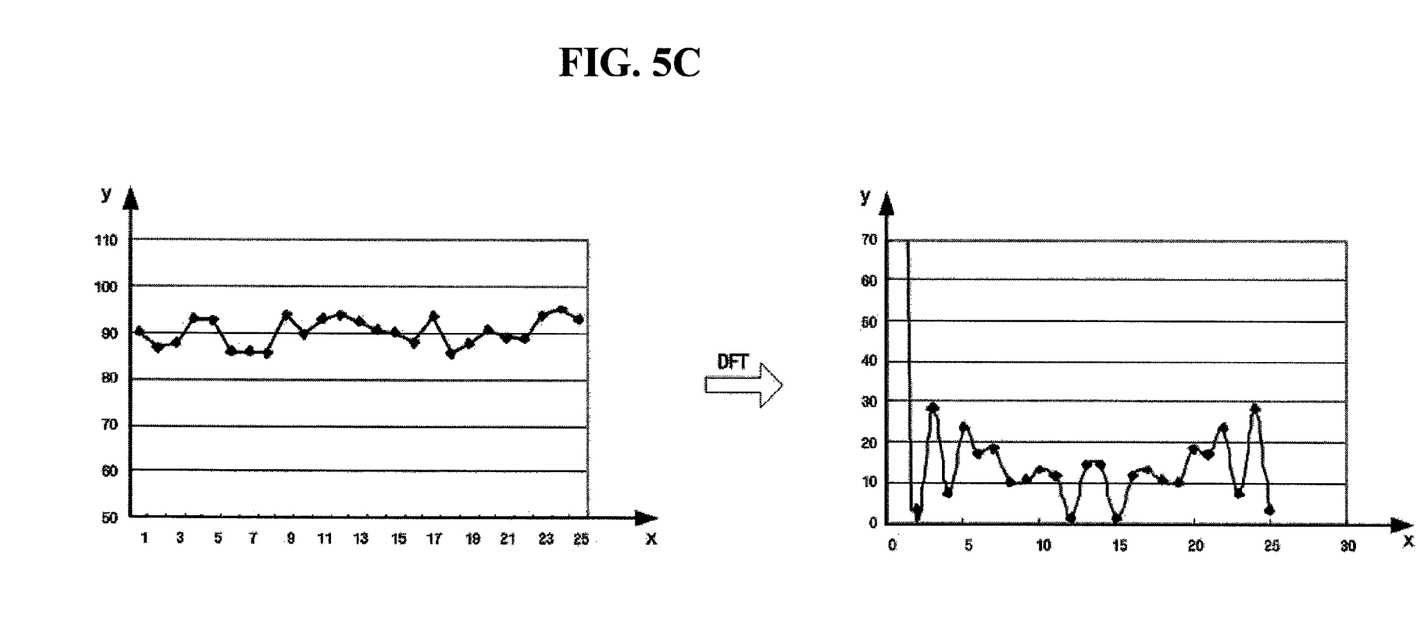

FIGS. 5A to 5C, are graphs illustrating the relation calculated in step S30 (shown at the left side of each figure), and a graphs illustrating the conversion relation calculated in step S40 (shown at the right side of each figure). In each the graph illustrating the relation calculated in step S30 (shown at the left side of each figure), the x axis indicates a wafer ID, and the y axis indicates a characteristic parameter value. In each graph illustrating the conversion relation calculated in step S40 (shown at the right side of each figure), the x axis indicates the frequency $\omega_p$, and the y axis indicates amplitude. When a lot unit of 25 wafers is used (W=25), as shown in FIG. 5A, if the relation has two periods, a frequency corresponding to a maximal value of the conversion relation is about 12 ($\square\omega_p=25/2$). And as shown in FIG. 5B, if the relation has three periods, a frequency corresponding to a maximal value of the conversion relation is about 8 ($\square\omega_p=25/3$). If the relation has four periods, a frequency is about 6 ($\square\omega_p=25/4$). Further, if one relation has continuity where the value of the relation is continuously increased, a frequency $\omega_p$ corresponding to a maximum value of the conversion relation becomes 1. As shown in FIG. 5C, when a specific pattern does not exist, a distinguished maximum value does not exist in the conversion relation.

According to an embodiment of the invention, the pattern may be manually determined by an operator, or may be automatically determined on the basis of predetermined references.

In the mode of manually determining the pattern, the operator views a graph of each of the first to n-th conversion relations, and detects a maximum peak shown in each graph. Thus, the operator determines a type (two periods, three periods, continuity, and the like) of a pattern of each of the first to n-th conversion relations from the frequency corresponding to the maximum peak, and determines a pattern degree of each of the first to n-th conversion relations from the height of the maximum peak. When the height of the maximum peak is large, the pattern degree is large. However, in the mode of manually determining the pattern, since absolute references do not exist, it may be determined whether a pattern exists or not, according to the judgment of each operator. Further, the graph of the conversion relation may be shown in several hundreds of pieces of paper to several thousands of pieces of paper. Therefore, it may be difficult for the operator to determine whether the pattern exists or not after thoroughly searching the graph.

In the mode of automatically determining the pattern on the basis of the predetermined references, a pattern parameter value is calculated from each of the first to n-th conversion relations, each pattern parameter value is compared with a reference value, and it is determined whether the pattern exists or not.

The pattern parameter value is a parameter value calculated from the conversion relation to determine what type of pattern the relation has. For example, the pattern parameter value may be a ratio between the maximum value and the average value in the conversion relation. In this case, the average value may be an average value among the other values except for the maximum value, such that the efficiency of the pattern parameter value can be improved.

Figure 6:
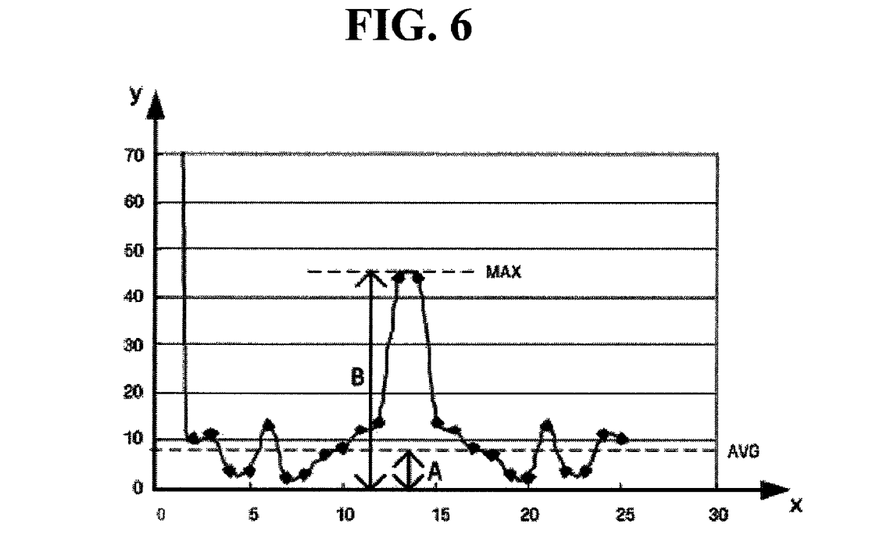
FIG. 6 is a graph illustrating a definition of a pattern parameter value, particularly, a SNR (Signal to Noise Ratio)

FIG. 6 is a diagram illustrating the pattern parameter value. The ratio between the maximum value MAX and the average value AVG is referred to as a SNR (Signal to Noise Ratio). Thus in FIG. 6, the condition SNR=B/A is satisfied, where A indicates the average value AVG in the conversion relation, and B indicates the maximum value MAX in the conversion relation. As such, since the SNR is a value that has considered an average component existing commonly in the process equipment, it is possible to objectively and more accurately determine whether the pattern exists or not.

The reference value may be a value obtained by the experimental determination by the operator.

As a result of comparing the pattern parameter value with the reference value, when the pattern parameter value is larger than the reference value, it can be objectively determined that the relation from which the pattern parameter is obtained has the pattern, and a process step corresponding to the relation may be defined as a failure process step. For example, when it is assumed that the pattern parameter value shown in FIG. 6 is about 5.6 ($\square$SNR=B/A=45/8) and the reference value is about 4, because the pattern parameter value is larger than the reference value, it can be determined that the pattern exists, in particular, referring to FIG. 6 since a maximum peak is obtained at about $\omega_p=12$, it can be decided that the relation has two periods. Accordingly, a process step corresponding to this relation may be defined as a process step having a two periodic failure.

The two periodic failures may occur in the following cases. For example, there are two process chambers that perform the same process step, and process steps of a plurality of wafers are performed through the two process chambers. In this case, when there occurs a failure in one of the two process chambers, since a yield is deteriorated in the wafers passing through the process chamber where a failure occurs, the two periodic failure occurs. Accordingly, when a specific process step is defined as a process step having the two periodic failure, the two process chambers of the process equipment used in the specific step needs to be investigated.

Further, as for the pattern parameter value, not only the SNR but also other values may be used. For example, a plurality of reference relations that indicate the typical patterns, such as the two periods, the three periods, the four periods, the continuity, and the like are calculated, the Fourier transform is performed on the plurality of reference relations, and a plurality of reference conversion relations are calculated. Correlation coefficients (for example, Pearson correlation coefficient) between the first to n-th conversion relations and the plurality of reference conversion relations are calculated, and the correlation coefficients may be defined as pattern parameter values. The Pearson correlation coefficient (Pearson product-moment correlation coefficient) measures the strength and direction of a linear relationship between the X and Y variables. The Pearson product-moment, correlation coefficient, which is obtained by dividing the covariance of the two variables by the product of their standard deviations.

When the correlation coefficient is used as the pattern parameter value, a reference value becomes 1. It may be determined that there is a pattern, when the correlation coefficient is approximately 1.

Figure 7:
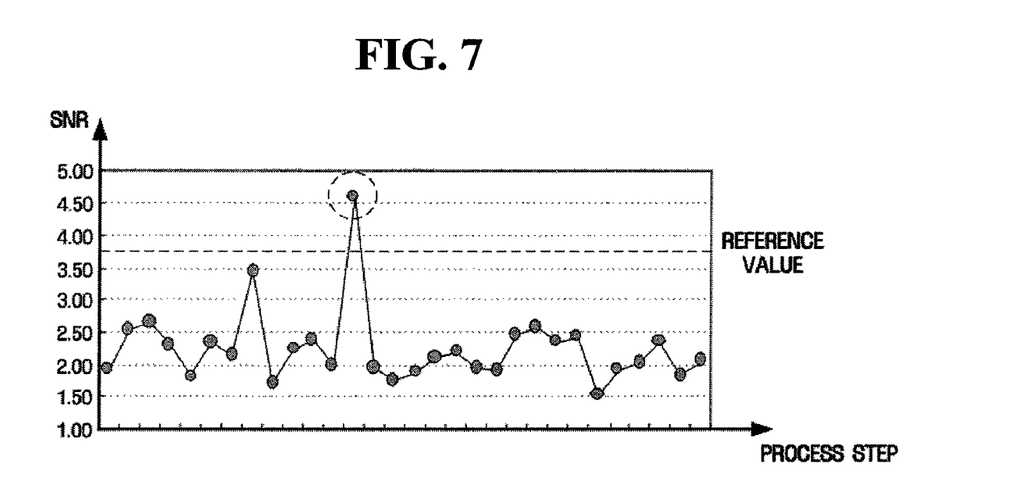
FIG. 7 is a graph illustrating a plurality of pattern parameter values (for example, SNR) calculated from a plurality of conversion relations with respect to a plurality of process steps.

FIG. 7 is a graph that shows the pattern parameter values that are calculated from the first to n-th conversion relations with respect to the first to n-th process steps. In this graph, the x axis indicates a process step, and the y axis indicates a pattern parameter value, for example, a SNR. In this way, the variation in the pattern parameter values with respect to the first to n-th process steps can be easily recognized from the graph. Further, a process step that, corresponds to a conversion relation having a pattern parameter value (see a dotted circle) larger than the reference value can be easily recognized.

Thus in the mode of automatically determining the pattern on the basis of the predetermined reference, it is possible to accurately determine whether the pattern exists or not, regardless of the propensities of a human operator. Further, since the failure process step can be quickly detected, the process managing efficiency can be improved.

Figure 8:
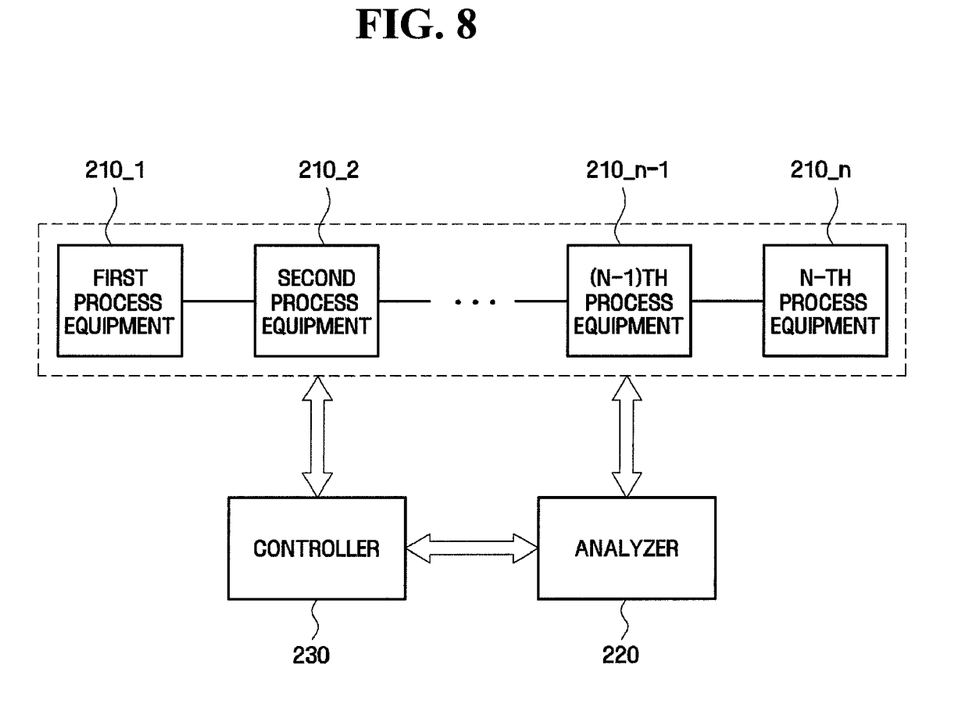
FIG. 8 is a block diagram illustrating a process managing system according to embodiments of the invention.

FIG. 8 is a block diagram illustrating a process managing system according to an embodiment of the invention. FIG. 8 shows an example of a system that, implements a method of managing a process according to the embodiments having been described with reference to FIGS. 1 to 7.

Referring to FIG. 8, the process managing system according to an embodiment of the invention includes a plurality of process equipment 210_1 to 210_$n$, an analyzer 220, and a controller 230.

The plurality of process equipment 210_1 to 210_$n$ sequentially perform the first to n-th (n is a natural number) process steps with respect to a plurality W of wafers. In particular, the process orders of the plurality of wafers in the first to n-th process steps may correspond to the first to n-th process orders, which are different from one another, but the invention is not limited thereto.

The analyzer 220 measures characteristic parameter values respectively of the plurality of wafers and calculates first to n-th relations between the first to n-th process orders and the characteristic parameter values, and performs a Fourier transform on the respective first to n-th relations so as to calculate first to n-th conversion relations, and determines whether the patterns exist or not in the first to n-th relations, based on the first to n-th conversion relations. In its determination of whether the patterns exist or not in the first to n-th relations, the analyzer 220 calculates pattern parameter values from the respective first to n-th conversion relations, and compares each of the plurality of pattern parameter values with the reference value. Each of the pattern parameter values may be a ratio (e.g., SNR) between a maximum value and an average value that are calculated from each of the first to n-th conversion relations. Further, the pattern parameter values may be correlation coefficients (for example, Pearson correlation coefficients) between the first to n-th conversion relations, and a plurality of reference conversion relations calculated by performing a Fourier transform on the plurality of reference relations showing the typical patterns. Further, as a result of determining the pattern, the analyzer 220 identifies a process step corresponding to the relation among the first to n-th relations, where it is determined that the pattern exists, as a failure process step.

The controller 230 controls the operation of the plurality of process equipment 210_1 to 210_$n$ and of the analyzer 220. In particular, when each of the process equipment 210_1 to 210_$n$ used in the process steps is batch equipment, the controller 230 provides the order code to the sorter, and the sorter changes the arrangement orders of the plurality W of wafers in the wafer transfer container (cassette) according to the order code. Further, when each of the process equipment 210_1 to 210_$n$ used in the process steps is single equipment, the controller 230 provides the order code to the process equipment 210_1 to 210_$n$, and the process equipment 210_1 to 210_$n$ perform the process orders of the wafers according to the order code.

Although the invention has been described in connection with the exemplary embodiments of the invention with reference to the accompanying drawings, it will be apparent to those skilled in the art that various modifications and changes may be made thereto without departing from the scope and spirit of the invention. Therefore, it should be understood that the above embodiments are not limitative, but illustrative in all aspects.

According to the method of managing a process and the process managing system according to the embodiments of the invention, a failure process step can be quickly detected, which improves process managing efficiency. In the following claims, n and P are natural numbers.

What is claimed is:

1. A method of processing a plurality W of semiconductor wafers, the method comprising:
   sequentially performing n (first to n-th) process steps on the plurality W of wafers, wherein the order of processing the W wafers is different in each of at least P of the n process steps, wherein n, P and W are real numbers, and P is equal to or less than n;
   determining the values of a first characteristic parameter for each of the W wafers;
   establishing for each one of the n (first to n-th) process steps a first data set that relates the first characteristic parameter values of the W wafers to the wafer processing order corresponding to each one process step;
   calculating a conversion relation for each of the n (first to n-th) process steps by performing a Fourier transform on the corresponding one of the n (first to n-th) first data sets; and
   using each one of the first to n-th conversion relations for detecting a pattern in at least one of the n (first to n-th) first data sets.

2. The method of claim 1,
   wherein establishing each first data set includes storing a corresponding one of the n (first to n-th) wafer processing orders;
   wherein establishing each first data set relates the first characteristic parameter values of the W wafers as a function of the wafer processing order corresponding to the process step;
   wherein detecting a pattern in each one of the n (first to n-th) data sets comprises:
   calculating a pattern parameter from the corresponding one of the n (first to n-th) conversion relations; and
   comparing the pattern parameter corresponding to the each one of the n (first to n-th) first data sets with a reference.

3. The method of claim 2, wherein the pattern parameter corresponding to each one of the n (first to n-th) first data sets is the ratio between the maximum value and an average value in each of the first to n-th conversion relations.

4. The method of claim 2, wherein each of the respective pattern parameters is Pearson correlation coefficients indicating correlation between the corresponding one of the n (first to n-th) conversion relations and a plurality of reference conversion relations calculated by performing a Fourier transform on each of a plurality of reference relations indicating typical patterns.

5. The method of claim 2, further comprising:
   generating graphs that indicate the pattern parameter values calculated from the first to n-th conversion relations, with respect to the first to n-th process steps.

6. The method of claim 1, wherein the detecting of the patterns in the n (first to n-th) first data sets comprises:
   examining respective graphs of the first to n-th conversion relations, and
   analyzing any maximum peaks shown in the respective graphs.

7. The method of claim 6, wherein analyzing of the maximum peaks includes: determining the types of patterns of the first to n-th first data sets from locations of the maximum peaks on the respective graphs, and determining pattern degrees of the first to n-th first data sets from the heights of the maximum peaks.

8. The method of claim 1, further comprising defining a process step as a failure process step, if the process step corresponds to the data set in which a pattern exists.

9. The method of claim 1, further comprising:
   examining respective graphs of the first to n-th first data sets; and
   examining respective graphs of the first to n-th conversion relations.

10. The method of claim 1, wherein if a process equipment used in the j-th process step is batch equipment, the wafer processing order of the wafers in that j-th process step is the arrangement order of the W wafers in the batch equipment, wherein j is a natural number and $1 \leq j \leq n$.

11. The method of claim 1, wherein if a process equipment used in the k-th process step among the n process steps is single-wafer process equipment, the wafer processing order in that k-th process step is determined using wafer-handling functions of the single-wafer process equipment, wherein k is a natural number and $1 \leq k \leq n$, determining the values of a first characteristic parameter for each of the W wafers;

establishing for each one of the n (first to n-th) process steps a first data set that relates the first characteristic parameter values of the W wafers to the wafer processing order corresponding to each one process step.

12. The method of claim 1, wherein the wafer processing order of each process step is different in all n of the n process steps.

13. A method of managing processing of a plurality W of semiconductor wafers, the method comprising:

determining the values of a first characteristic parameter for each of the plurality W of wafers on which n (first to n-th) process steps have been performed, wherein the W wafers have been processed in different wafer processing orders in each of at least three of the n process steps;

establishing for each one of the n (first to n-th) process steps a first data set that relates the characteristic parameter values to its wafer processing order;

performing a Fourier transform on each one of the n (first to n-th) first data sets to calculate n conversion relations; and detecting any pattern in each first data set using the conversion relations.

14. The method of claim 13, wherein the detecting of any pattern in each first data set comprises:

calculating a pattern parameter from the corresponding conversion relation of each first data set; and comparing each of the pattern parameter values with a reference value.

15. The method of claim 14, wherein the pattern parameter values corresponding to each process steps are Pearson correlation coefficients between its conversion relation and a plurality of reference conversion relations calculated by performing a Fourier transform on each of a plurality of reference relations indicating typical patterns.

16. The method of claim 13, wherein the detecting of any pattern in each first data set comprises:

examining graphs of the conversion relations, and analyzing any maximum peaks shown by the graphs.

17. The method of claim 16, wherein, the analyzing of the maximum peaks includes determining types of patterns of the relations from locations of the maximum peaks on the graphs, and determining pattern degrees of the relations from the heights of the maximum peaks.

18. A method of managing processing of a plurality P of semiconductor wafers, the method comprising:

calculating characteristic parameter values for the plurality P of wafers on which processes are performed in specific process orders;

calculating relations that indicate relationships between the specific process orders and the characteristic parameter values;

performing a Fourier transform on the relations so as to calculate conversion relations; and determining any patterns among the relations using the conversion relations;

wherein the determining of the patterns among the relations comprises:

calculating pattern parameter values from the conversion relations, respectively;

comparing each of the pattern parameter values with a reference value;

wherein each of the pattern parameter values is the ratio between the maximum value and an average value calculated from each of the conversion relations.

19. A process managing system comprising:

a plurality of process equipments configured to sequentially perform n (first to n-th) process steps with respect to a plurality W of wafers, wherein the order of processing the W wafers is different in each of a least three of the n process steps;

an analyzer configured to detect first characteristic parameters of the plurality W of waters and to establish for each one of the n (first to n-th) process steps a first data set that relates the first characteristic parameter values of the W wafers to the wafer processing order corresponding to each one process step, and to perform a Fourier transform on each of the n first data sets to calculate n conversion relations, and to detect any pattern in any of the n first data sets using the n conversion relations.

20. The process managing system of claim 19, wherein the detecting of a patterns comprises:

calculating a pattern parameter from each of the n conversion relations; and comparing each of the pattern parameters with a reference.

21. The process managing system of claim 20, wherein each pattern parameter is the ratio between the maximum value and an average value calculated from the corresponding conversion relations.

22. The process managing system of claim 20, wherein the respective pattern parameter values are Pearson correlation coefficients between the corresponding conversion relation and a plurality of reference conversion relations calculated by performing a Fourier transform on each of a plurality of reference relations indicating typical patterns.

23. The process managing system of claim 19, wherein the analyzer defines the i-th process step as a failure process step if the i-th process step corresponds to a first data set in which a pattern exists among the first to n-th relations, wherein i is a natural number and $1 \leq i \leq n$.

24. The process managing system of claim 19, wherein, if a process equipment used in the j-th process step among the n process steps is batch equipment, the arrangement order of the W wafers in the batch equipment is according to an order code provided by the controller, wherein j is a natural number and $1 \leq j \leq n$.

25. The process managing system of claim 19, wherein, if a process equipment used in the k-th process step among the n process steps is single equipment, the controller provides an order code to the process equipment, and the process equipment sequentially processes the W wafers in a wafer processing order according to the order code, wherein k is a natural number and $1 \leq k \leq n$.

26. The process of managing system of claim 19, wherein the wafer processing orders are different in all n of the n process steps.

* * * * *